US007000907B2

(12) United States Patent
Achenbach

(10) Patent No.: US 7,000,907 B2
(45) Date of Patent: Feb. 21, 2006

(54) SPRING SYSTEM FOR BICYCLES

(75) Inventor: Martin Achenbach, Biel (CH)

(73) Assignee: DT Swiss Inc., Grand Junction, CO (US)

( * ) Notice: Subject to any disclaimer, the term of this patent is extended or adjusted under 35 U.S.C. 154(b) by 0 days.

(21) Appl. No.: 10/144,444

(22) Filed: May 10, 2002

(65) Prior Publication Data
US 2002/0190445 A1 Dec. 19, 2002

(30) Foreign Application Priority Data
May 10, 2001 (DE) ................................ 101 22 730

(51) Int. Cl.
*F16F 5/00* (2006.01)
(52) U.S. Cl. ............................... 267/64.26; 267/64.25; 188/317; 280/124.162
(58) Field of Classification Search ............... 188/268, 188/269, 271, 282.1, 285, 297, 302, 316, 188/317; 267/64.25, 64.26; 280/124.177, 280/124.162; 11/11
See application file for complete search history.

(56) References Cited

U.S. PATENT DOCUMENTS

| | | | | |
|---|---|---|---|---|
| 2,756,071 A | | 7/1956 | Riva | |
| 3,610,604 A | * | 10/1971 | Terai | 267/39 |
| 3,794,309 A | * | 2/1974 | Chrokey et al. | 267/34 |
| 3,804,446 A | * | 4/1974 | Warrener | 293/134 |
| 3,976,287 A | * | 8/1976 | Kendall et al. | 267/139 |
| 4,078,638 A | * | 3/1978 | Koyama et al. | 188/288 |
| 4,796,871 A | * | 1/1989 | Bauer et al. | 267/64.11 |
| 4,899,853 A | * | 2/1990 | Hummel | 188/269 |
| 5,158,270 A | * | 10/1992 | Lin | 267/226 |
| 5,257,680 A | * | 11/1993 | Corcoran et al. | 188/129 |
| 5,417,446 A | * | 5/1995 | Pileggi | 280/276 |
| 5,511,811 A | * | 4/1996 | Pileggi | 280/276 |
| 5,913,391 A | * | 6/1999 | Jeffries et al. | 188/317 |
| 5,948,021 A | * | 9/1999 | Radcliffe | 623/44 |
| 6,105,988 A | * | 8/2000 | Turner et al. | 280/276 |
| 6,135,434 A | * | 10/2000 | Marking | 267/64.26 |
| 6,296,092 B1 | | 10/2001 | Marking et al. | |
| 6,311,962 B1 | * | 11/2001 | Marking | 267/64.25 |
| 6,360,857 B1 | | 3/2002 | Fox et al. | 188/281 |
| 6,520,524 B1 | * | 2/2003 | Costa | 280/276 |

FOREIGN PATENT DOCUMENTS

| | | | |
|---|---|---|---|
| DE | 919 150 C | | 10/1954 |
| DE | 1 505 522 | | 4/1970 |
| DE | 3228694 | * | 2/1984 |
| DE | 89 08 133 U1 | | 10/1989 |
| DE | 94 00 166.9 U1 | | 4/1994 |
| DE | 200 05 224 U1 | | 8/2001 |
| DE | 100 11 767 C1 | | 10/2001 |
| FR | 1073744 | | 9/1954 |
| GB | 2262583 | * | 6/1993 |
| JP | 61167730 | * | 7/1986 |
| WO | WO 99/03 721 A1 | | 1/1999 |
| WO | WO 99/03726 | | 1/1999 |
| WO | WO 9903721 | * | 1/1999 |

* cited by examiner

Primary Examiner—Devon C. Kramer
(74) Attorney, Agent, or Firm—Greer, Burns & Crain, Ltd.

(57) ABSTRACT

The present invention relates to a spring system for bicycles having a first load-applying segment and a second load-applying segment as well as at least one positive spring and at least one negative spring arranged to be effectively operable between the first and the second load applying segments.

20 Claims, 4 Drawing Sheets

SPRING SYSTEM FOR BICYCLES

The present invention relates to a spring system for bicycles.

There are many different designs to bicycle spring systems already known.

One known spring system is mounted in a region of a bicycle fork to be effectively operative between the front wheel of the bicycle and the bicycle frame.

Another known spring system for bicycles is effectively operative between a rear assembly coupled to a bicycle frame and said bicycle frame.

This known spring system comprises a steel spring which radially inwardly accommodates a damping means likewise operative between said bicycle frame and rear assembly.

Another known spring mechanism for bicycles is arranged to be effectively operative between a rear assembly coupled to a bicycle frame and said bicycle frame and has a positive chamber as well as a negative chamber.

It is the task of the present invention to provide for a further spring system.

This task is solved by a spring system in accordance with claim 1.

Preferred configurations comprise the subject matter of the subclaims.

It must first be pointed out that the inventive spring system may be utilized in a wide variety of technical applications. For instance, the inventive spring system may be employed in various types of vehicles such as, for example, motor vehicles, two-wheeled vehicles, in particular motorcycles and bicycles, or the like. The inventive spring system may also be utilized in other technical devices such as, for example, machines, etc.

For purposes of simplification, the inventive spring system will be exemplarily described within the context of this disclosure as a spring system used or for use in bicycles. Doing so, however, is not to be construed as a limitation of the invention.

It is to be noted that a preferred configuration of the present inventive spring system may be utilized for the spring suspension and, as need be, the damping of a rear wheel of a bicycle. Such an inventive spring system is effectively operative between, for example, a bicycle frame and a rear assembly disposed coupled to said bicycle frame.

In particular, the present invention provides for a spring system for bicycles having a first load-applying segment, a second load-applying segment, a positive spring and a negative spring, whereby a full floating piston is disposed between said positive spring and said negative spring.

In the sense of the present invention, a load-applying segment is to be understood particularly as an area of the spring system which can be coupled with conversion elements such that the spring system has an operative effect between two or more of said conversion elements.

Such load-applying segments may be, for example, segments of said spring system housing which are arranged to be displaceable relative one another such as, for example, cap-like terminating ends of different cylindrical parts of the housing which are displaceable in axial direction relative one another. Said load-applying segments may be, for example, configured in eyelet or grommet fashion. Load-applying segments of cylindrical configuration are also preferred. Load-applying segments may particularly be configured such that same may accommodate mounting means such as, for example, a screw or a pin or the like. It is however noted that a load-applying segment may also be configured differently.

The positive spring and the negative spring are arranged to be effectively operative and/or spatially situated between the first and the second load-applying segment.

In preferential configuration, the positive spring and the negative spring each abut the full floating piston and in fact especially so as to contact same. In so doing, it is particularly preferred for the positive spring and the negative spring, provided they are each subject to stress, to bias the piston and, in particular, in the axial direction.

Preferably, the positive spring and the negative spring are each arranged in separate chambers or configured to work in concert with a chamber of such type.

The latter may be seen in the case of, for example, a gas spring where gas arranged in a chamber is under pressure or can be subjected to pressure, thereby exhibiting a spring effect. The cited pressure is in particular greater than the ambient pressure.

A third spring apart from the positive and the negative spring is furthermore provided in preferred configuration which can load the full floating piston. This third spring abuts the piston in the preferred configuration.

It is preferable for the third spring to be arranged on the axially same side of the floating piston as is the negative spring. The positive spring is preferably arranged on the other axial side of said piston.

In a preferred configuration of the present invention, the third spring may also be arranged on the axially same side of the piston as is the positive spring.

Other spring arrangements, in particular arrangements relative to the piston, are likewise preferred.

In particularly preferred configuration, said positive spring, said negative spring and said third spring are arranged relative to one another such that any forces acting between said springs will be transferred to said full floating piston. Thus, it is especially preferred that in the case of several of the springs of the group comprising the third spring, the positive spring and the negative spring acting on the piston from the same axial side of said piston, same are not successively operative.

There are in principle no limitations as to the type of spring and the material properties thereof for the positive spring, the negative spring and the third spring. Said respective springs may be, for example, gas springs, elastomer springs, helical springs, cup springs, etc.

A particularly preferred configuration, however, provides for configuring the positive spring as a gas spring. It is further preferred to configure the negative spring as a gas spring or as an elastomer spring and to configure the third spring as a gas spring or as an elastomer spring.

The positive spring, the negative spring and the third spring may also be a combination of different types of spring means.

The negative spring is in particular a spring which acts to counter the positive spring and particularly such that said negative spring loads components arranged to be displaceable relative one another in an effective direction which is opposite to the effective direction in which the positive spring loads said components when said springs are being stressed and acting upon said components.

In the case of two cylinders arranged axially displaceable relative one another, it is especially preferred that the positive spring biases said cylinder toward a greater spatial distance, an extended position respectively, while the negative spring biases said cylinder toward less of a spatial distance, retracted position respectively.

The third spring mechanism different from both the positive spring as well as the negative spring may also be arranged and/or operative as a positive spring or as a negative spring.

The full floating piston preferably has at least one first wall section which extends substantially in radial direction as well as a second wall section which likewise extends substantially in radial direction and which differs from said first wall section.

In a preferred configuration, recesses are provided in the first and/or the second substantially radially extending wall section. Preferably at least a portion of said recesses accommodates a sealant.

It is preferable for said first wall section and said second wall section—as seen in the axial direction of the piston—to be arranged offset or spatially distanced from one another.

Said first wall section is preferably solidly coupled to said second wall section.

In accordance with the present invention, it is preferred for the first radially extending wall section of the full floating piston to be solidly coupled to the second likewise substantially radially extending wall section by means of a third, substantially axially extending wall section.

In a particularly preferred configuration, the surface area of the substantially axially extending wall section of the full floating piston serves as a bearing surface. It is particularly provided that the substantially axially extending wall section of the full floating piston be of cylindrical configuration, whereby a radially inward situated surface area of said cylindrically configured axial wall section is directed to a first cylinder. The following will go into detail with respect to said first cylinder.

The axially extending third wall section of the full floating piston is especially preferred to be of cylindrical configuration.

The first radially extending wall section as well as the second substantially radially extending wall section of said full floating piston are preferably of ring shape. It is however to be noted that other shapes are likewise preferred. It is further to be noted that the "radial extension" to the first wall section, the second wall section respectively, is particularly to be understood as that said wall sections also extend at least in radial direction. Additional extension can be provided for in axial direction as need be.

The axial offsetting provided between the first and the second wall section of the full floating piston may be such that an area results between the first wall section and the second wall section in the axial direction, into which neither said first nor second wall section extends. The axial offsetting may however also be so configured that no such area results in the axial direction; as an example, the first and the second wall section may overlap axially. It is furthermore preferred that the first wall section and the second wall section, when seen in the axial direction, are arranged substantially in the same area. Particularly with the latter configuration, it is especially preferred that one of said wall sections is provided radially inward with a bushing-like element extending substantially axially and the other wall section provided radially outward with such a bushing-like element extending substantially axially which, for example, is of cylindrical form.

This type of bushing-like element preferably comprises a bearing surface as previously mentioned.

In accordance with a further preferred configuration, it is provided that the full floating piston is to be configured such that a ring-shaped piston area is disposed and affixed on a bushing-like, particularly cylindrical element at one axial end such that a portion of said piston area extends radially outwardly from said bushing-like element and a portion of said piston area extends radially inwardly from said bushing-like element.

In a preferred configuration of the present invention, at least one section of the bushing-like or cylindrical element of the piston, the axially extending wall section respectively, forms a partition which separates the different chambers from one another. In its preferential function as a partition, said bushing-like element, respectively cylindrical element or substantially axially extending wall section may function, for example, as such a partition or partitioning wall section between one chamber housing a negative spring and one chamber housing a third spring. It is to be noted however that this function as partition or partitioning wall section is a preferred configuration of the present invention which may also be omitted.

The full floating piston is preferably of rotation symmetrical configuration.

It is preferred that the full floating piston is of substantially cup-shaped configuration. In a particularly preferred configuration, said full floating piston is substantially of cup-shaped configuration and provided with an opening in the bowl base section which is in particular circular and arranged concentrically to the longitudinal axis of the cup's bowl shape. Preferably the cup's bowl shape is configured such that it has a ring flange at its end region extending outwardly opposite its base. It is furthermore preferred to axially arrange such a radially outward extending ring flange between the ends of such a cup-shaped full floating piston.

In preferential configuration, a first piston area arrangement of the full floating piston, which is arranged in a first axial direction of said full floating piston, is contacted, respectively loaded by at least two different spring mechanisms.

The term "first piston area arrangement" and corresponding applies to the "second piston area arrangement" term used in the following and is to be understood particularly in that there are different piston areas separated from one another or in that a contiguous piston area is given.

The two different spring mechanisms which, upon the corresponding arrangement, load the first piston area arrangement are particularly preferred in parallel arrangement to one another.

The term "parallel" is to be understood in this context in a functional and/or geometric sense.

It is however noted that particularly the term "parallel" is to be understood in a broad geometric sense; in particular, "parallel" is also to be understood in that the forces said springs introduce respectively to a floating piston exhibit a parallel force component which preferably acts in the axial direction.

The forces said at least two different spring mechanisms introduce to a floating piston may be of equal or differing magnitudes.

In a preferred configuration, at least one further spring mechanism loads and contacts a second piston area arrangement of said full floating piston which is aligned to a second axial direction facing the first opposing axial direction. It is to be noted in conjunction with the cited contact between the respective spring mechanisms and the full floating piston, that the term "contacting" is to be understood particularly in that the spring comes into contact with the full floating piston in the actual sense or in that the connection between the respective spring mechanism and the full floating piston is realized via rigid components. Although it must be noted that it is also preferred for elements to be provided between the respective spring mechanism and the full floating piston which are not of rigid configuration such as, for example, rubber caps or the like.

In preferred configuration, the present inventive spring system furthermore has a damping means or works in concert with a damping means.

In especially preferred configuration, a housing is provided to accommodate the spring mechanism of the spring system as well as a damping means.

The damping means is particularly a damping means based on a hydraulic principle. The damping means may, however, also be configured in another fashion, for instance as a damping means based on a "pneumatic principle."

In the sense of the present invention, the "hydraulic principle" and/or "pneumatic principle" is to be understood in particular as there being fluid or gas being moved between the different chambers for the purpose of damping. In particular, passages or openings are hereto provided through which the gas or fluid flows between the different chambers. It is to be noted that damping means of this preferred type is not to constitute a limitation of the concept of damping means.

In preferred configuration, a damping means is arranged, in particular effectively operative, between the first and the second load-applying segment.

This type of damping means can be especially configured such that the damping behavior dynamics, and especially the damping rate of said damping means is adjustable.

Such adjustments can be realized particularly by means of manually operable regulator elements.

This type of adjusting can also be generated automatically. Same may be induced for example in the manner of, respectively by means of a device and configuration as described in the German patent application [following the corresponding notification of the file number of one of the parallel applications filed by the applicant, same will be inserted here; said patent application is an application from the same applicant given the title of "Feder-Dämpfersystem für Fahrräder" filed with the German Patent and Trademark Office on the same day as the present application].

It is preferred to provide for a first cylinder as well as a second cylinder in which said first cylinder is accommodated with axial flexibility. These cylinders are such arranged relative one another that, for example, they mutually direct each other axially.

A gap is preferably configured between the first cylinder and the second cylinder in which a spring may be and/or is accommodated which acts—with respect to said cylinder arrangement—in axial direction.

It is especially preferred to accommodate the negative spring in said gap. The negative spring can, for example, be received in said gap such that it is supported in the axial direction on one hand by a first substantially radially extending wall section of the full floating piston and, on the other hand, by a second cylinder. To this purpose, an area can be provided, for example, extending radially inwardly from the casing wall of the first cylinder on the end of the second cylinder facing said first cylinder which is solidly coupled to said second cylinder. As need be, this area is sealed relative said first cylinder.

The positive spring is likewise supported in preferential configuration at the floating piston as well as at the second cylinder.

It is however preferably provided for the positive spring and the negative spring to load the full floating piston—axially—in opposing directions. Accordingly, it is preferably provided for the positive spring and the negative spring to load the second cylinder in opposing directions.

The third spring is preferably arranged such that it axially loads the floating piston as well as the first cylinder. The third spring is preferably supported at a damping cap which is coupled—in particular, fixedly—to the first cylinder.

The third spring may, however, also be arranged differently. It is also preferred for the third spring to be supported at the floating piston as well as at the second cylinder.

It is to be noted that, as regards the springs, the terms "load" and "support" respectively, are in particular to be understood such that said "load" and/or "support" results from at least one given external load acting on the spring system. The configuration may however also be that upon certain external loads, one or more springs are arranged such that no "load" and/or "support" is yielded. Although it is also preferred that independent of any external loads, "load," respectively "support," is always yielded. This is in particular the case when the respective spring is pre-tensioned such that a spring tensioning is always given independent of the magnitude and/or effective direction of any external load.

The third spring may in particular function as an additional positive or additional negative spring.

In preferred configuration, the full floating piston is arranged such that it projects axially over the end of the first cylinder facing the second cylinder.

The axial displaceability of the full floating piston is preferably restricted by suitable stop means in at least one orientation.

It is especially preferred for the first cylinder, respectively a component coupled solidly thereto, to act as a stop means for the full floating piston in axial direction.

In accordance with a preferred embodiment of the present invention, at least one stop means is provided with a component which exhibits a damping effect upon striking.

It is preferred in particular that a stop means is provided for restricting the mobility of the floating piston in both axial directions, respectively orientations.

It is preferably provided that the floating piston is directed in axial direction at the first cylinder and the stop means prevents said piston from departing from this axial guidance.

It is preferred to provide the full floating piston with at least one slide bearing bushing, especially one which is pressed in/on. Such a slide bearing bushing is preferably disposed on the radially inward situated surface of the floating piston which slides on the external surface of the first cylinder casing wall during operation. In preferential configuration, such a slide bearing bushing is—alternatively or additionally—provided on the radially outer situated surface of the floating piston which slides on the inner surface of the second cylinder casing wall during operation.

It is preferably provided that the third spring (upon an external pressure load to the spring system, retraction of said spring system respectively) induces an extending to the spring system's spring's characteristic curve. The invention is not to be restricted in this context. It is noted in conjunction hereto, without hereby restricting the invention, that in configurations of the spring system, the third spring is preferably to extend the characteristic curve to the spring system's spring in the utilization of one or more gas springs (e.g. configuring positive and/or negative spring as a gas spring).

A particularly preferred configuration provides for the adjusting of the spring tensioning of one or more of said cited springs—especially in the fully extended state of said spring system. For example, the pre-tensioning of the positive spring and/or the negative spring can be adjusted.

With springs configured as gas springs, this can be induced in particular by correspondingly filling chambers with gas.

The invention is not to be limited by its exemplary and preferential embodiments.

Without hereby constituting a limitation of the present invention, the following will describe a number of particularly preferred aspects of the invention in greater detail based on reference to the drawings, which show:

Figure 1:
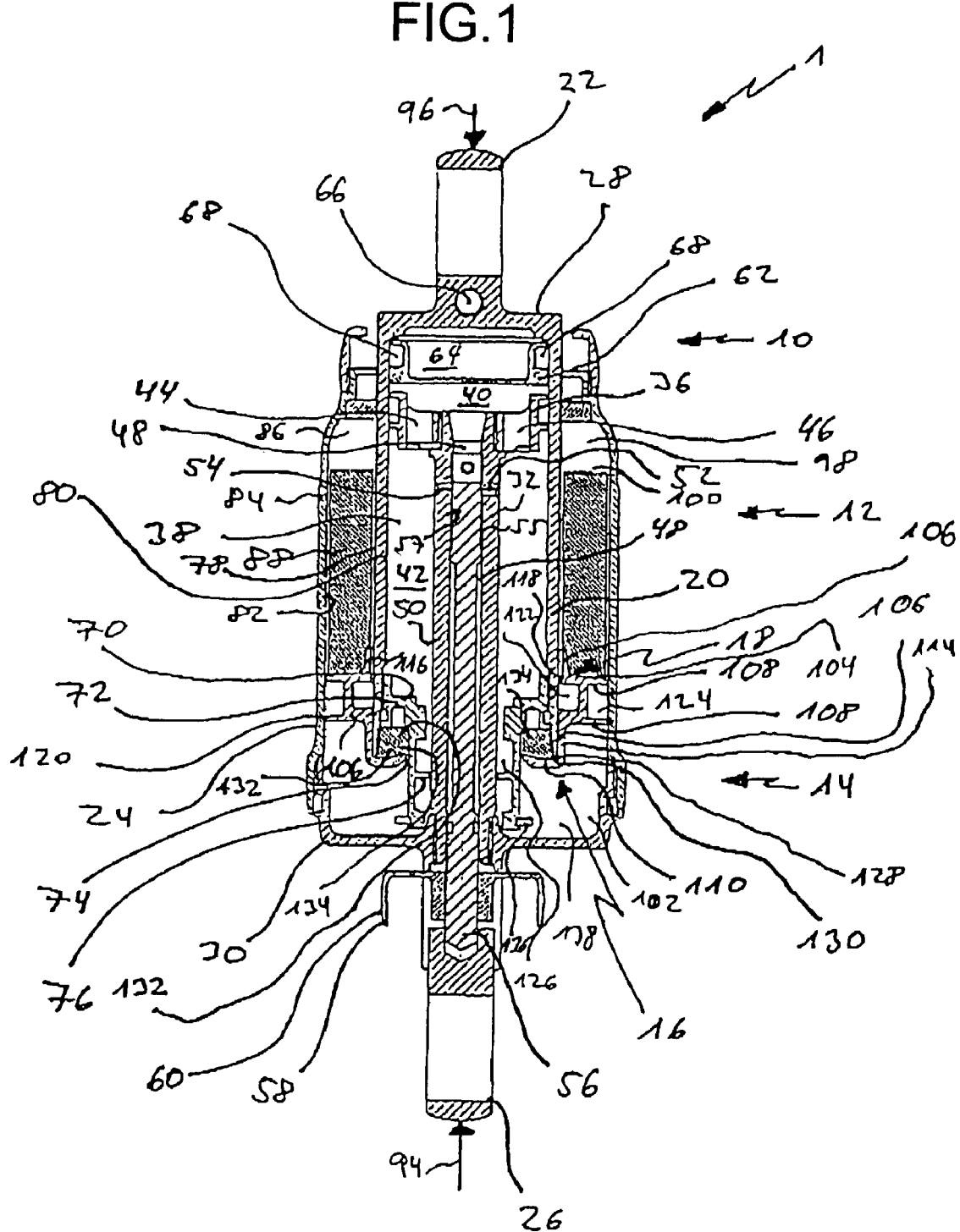
FIG. 1 is a schematic representation of a first exemplary embodiment of the invention in a first position.

FIG. 1 shows an exemplary embodiment of an inventive spring system 1 in schematic representation. The spring system comprises several springs 10, 12, 14, 16 as well as a damping means 18.

In the configuration according to FIG. 1, a first cylinder 20 is provided to which a first load-applying segment 22 is solidly coupled, as well as a second cylinder 24 to which a second load-applying segment 26 is solidly coupled.

First cylinder 20 is accommodated to be axially displaceable in second cylinder 24.

The first load-applying segment 22 disposed on first cylinder 20 is of grommet form, cylindrical configuration respectively, and arranged on a closed front face side 28 of first cylinder 20 opposite said second cylinder 24.

Second load-applying segment 26, which is likewise of a type of grommet or cylindrical configuration, is solidly coupled axially to a cap 30 which terminates the second cylinder 24 at the side opposite said first cylinder 20. Said cap 30 is solidly connected to said second cylinder 24. This connection may be, for instance, a bolted connection.

A piston rod 32 is furthermore solidly coupled to second cylinder 24, cap 30 respectively, which extends axially into second cylinder 24 and accommodates a damper piston 36 in first cylinder 20.

Damper piston 36 is arranged so as to be axially flexible within an interior 38 of first cylinder 20 and separates a first damper chamber 40 from a second damper chamber 42.

Damper piston 36 is provided with a plurality of passage openings 44, 46 which connect said first damper chamber 40 with said second damper chamber 42 such that damping fluid present in the damper chambers 40, 42, which is in particular designed to be oil, can move between said chambers for the purpose of damping.

Valve devices such as check valves are provided as necessary in the region of said passage/damping openings 44, 46 which induce a different damping effect to be yielded in opposite damping directions. Said valve devices may be configured, for example, such that upon a pressure being introduced to load-applying segments 22, 26, oil can flow through damping openings 44, 46 from the first chamber 40 into the second chamber 42, while upon a tensile load, oil is prevented from flowing through said damping openings 44, 46 from the second chamber 42 to the first chamber 40. Such valve devices can be configured as, for example, small spring plates disposed on said damper piston 36.

Piston rod 32 has an axially extending cavity 48 surrounded by a piston rod casing wall 50.

Passage/damper openings 52, 54 are provided in piston rod casing wall 50 which connect cavity 48 with the second damper chamber 42.

A control rod 56 extends into cavity 48 of piston rod 32. Said control rod 56 is arranged to be axially movable within cavity 48. Control rod 56 is configured such that, in the corresponding axial position, it can seal damping opening 52 and, as required, damping opening 54, so that no oil can move between second chamber 42 and cavity 48 through said openings 52/54. In other axial positions, control rod 56 provides no obstruction of damping opening 52 so that oil can flow through same for the purpose of damping.

Control rod 56 is provided with a male threading 55 which engages with a female threading 57 arranged on piston rod 32. Upon control rod 56 twisting relative piston rod 32, threads 55, 57 induce an axial adjustment of control rod 56 relative piston rod 32.

Female threading 57 is arranged in the region of damping openings 52, 54 in the configuration according to FIG. 1. Same may however also be arranged at a greater distance from said damping openings 52, 54.

Male threading 55 may be arranged such that damping opening 52 and/or 54—upon the corresponding position of control rod 56—is covered by an area of control rod 56 provided with male threading 55 or such that damping opening(s) 52 and/or 54—upon the corresponding position of control rod 56—is/are covered by an area of control rod 56 which has no male threading 55.

Cavity 48 is opened to first chamber 40 such that upon the corresponding axial position of control rod 56, oil can flow through damping opening 54, 52 respectively, between first chamber 40 and second chamber 42 and vice-versa, thus inducing a damping effect.

Control rod 56 is connected to a regulating mechanism 58 which can induce an axial displacement and/or adjustment of control rod 56 within piston rod 32. Regulating mechanism 58 comprises a setting wheel 60 in the configuration according to FIG. 1 which, upon being correspondingly turned, induces a rotation of control rod 56 so that control rod 56 is adjusted axially relative the piston rod by means of threading 55, 57. In the configuration according to FIG. 1, control rod 56 is supported—especially with respect to piston rod 32—at second cylinder 24, cap 30 respectively.

Setting wheel 60 is arranged on cap 30 in the configuration according to FIG. 1 and substantially so as to be axially fixed and rotatable. Setting wheel 60 accommodated control rod 56 in axially displaceable and non-rotatable fashion. To this purpose, control rod 56 is provided with an external hexagonal socket which engages with an internal hexagonal socket on setting wheel 60. The non-rotatable connection between setting wheel 60 and control rod 56 transmits a rotational motion of setting wheel 60 to control rod 56 so that same is adjusted axially by means of threadings 55, 57. The threading can be configured to be self-locking. Non-self-locking threading may also be provided. Particularly in the latter case, it may make sense to additionally provide a locking mechanism for axially securing control rod 56 relative piston rod 32, second cylinder 24 respectively.

It is to be noted that setting wheel 60 may also be arranged to be axially movable relative second cylinder 24, cap 30 respectively, and have a solid axial coupling to control rod 56. The non-rotatable connection between setting wheel 60 and control rod 56 may also be generated by other appropriate connective means which, for example, induce the generating of an interlocking or tensionally-locked connection.

First damper chamber 40 is restricted on the side opposite second cylinder 24 by a full floating separator piston 62. Said full floating separator piston 62 moreover restricts a gas-filled chamber 64 which can be filled with gas by means of an opening 66 provided with the appropriate valve mechanism. Gas-filled chamber 64 acts as a gas spring (spring mechanism 10).

Separator piston 62 is sealed relative first cylinder 20 by means of an appropriate sealant 68.

Second damper chamber 42 is restricted at its end opposite first damper chamber 40 by a damper cap 70.

Said damper cap 70 has a radially-extending section 72 as well as an axially-extending section 74.

Radial section 72 extends radially outwardly from axial section 74.

Damper cap 70 moreover has a second radial section 76 extending radially inwardly from axial section 74 of damper cap 70. Radial section 76 of damper cap 70 is disposed with an opening through which piston rod 32 extends.

Radial section 72 of the damper cap is arranged closer to the first force-applying segment 22 than radial section 76 of said damper cap 70.

A gap 86 is provided between an outer surface 78 of the casing wall of first cylinder 20 and an inner surface 82 of a casing wall 84 of second cylinder 24 in which spring mechanism 12 is arranged. Said spring mechanism 12 is configured as an elastomer negative spring 88 in the configuration according to FIG. 1.

Elastomer negative spring 88 acts as a negative spring and comprises an elastomer, respectively is formed by an elastomer.

Elastomer negative spring 88 is of hollow cylindrical design in the configuration according to FIG. 1. Elastomer negative spring 88 is furthermore designed according to the FIG. 1 configuration such that, in the relieved state, it is arranged with radial clearance play 90, 92 between the outer surface 78 of casing wall 80 of first cylinder 20 and the inner surface 82 of casing wall 84 of second cylinder 24.

The elastomer negative spring 88 may however also be configured, which is not shown in FIG. 1, such that, in the relieved state, it abuts outer surface 78 and inner surface 82 substantially free of play. As the need arises, the spring may even be tensioned radially while being substantially relieved axially.

Elastomer negative spring 88 is furthermore dimensioned in the configuration according to FIG. 1 such that it is axially relieved upon the retraction of spring system 1, the pressuring of spring system 1 respectively, as schematically indicated by arrows 94, 96, before the spring system 1 advances to the stop, is fully retracted respectively. As soon as the elastomer negative spring 88 is fully relieved in the axial direction and the spring system 1 continues to retract, a material-free chamber 98 of a chamber 100, in which the elastomer negative spring 88 is arranged, enlarges upon further retraction.

It is however to be noted in conjunction hereto that the elastomer negative spring 88 may also be dimensioned such that it is not relieved until spring system 1 has been fully retracted, or such that it is still subject to stress once spring system 1 has been fully retracted.

The elastomer negative spring 88 of a full floating piston 106 contacts the spring mechanism 14 configured as a positive spring 102 at its facing end 104, at the least when it is loaded or tensioned in the axial direction, so that said elastomer negative spring 88 loads full floating piston 106.

Full floating piston 106 is of cup-shaped and substantially rotation symmetrical configuration.

Full floating piston 106 has a first wall section 108 extending in substantially radial direction as well as a second wall section 110 extending in substantially radial direction.

Said full floating piston 106 furthermore comprises a wall section 112 extending in substantially axial direction.

Wall section 112 forms a connecting wall 114 between said first radial wall section 108 and said second radial wall section 110. A further segment of axial wall section 112 forms an axial appendage on the side of the first radial wall section 108 opposite connecting wall 114.

The radially inward situated region of axial wall section 112, first radial wall section 108 respectively, is supported at the outer surface 78 of casing wall 80 of said first cylinder 20.

A radially outward situated region 120 of said first radial wall section 108 is supported at the inner surface 82 of the casing wall 84 of said second cylinder 24.

In the region of axial wall section 112, first radial wall section 108 respectively, a radially inward situated recess 122 is provided to receive a (not shown) sealant. Said (not shown) sealant seals full floating piston 106 relative first cylinder 20.

A recess 124 is provided in the radially outward situated region of said first radial wall section 108 of said full floating piston 106 to receive a (not shown) sealant, which seals the full floating piston 106 relative second cylinder 24.

The first radial wall section 108 extends radially outwardly from axial wall section 112 of full floating piston 106.

The second radial wall section 110 extends radially inwardly at the end region of axial wall section 112 of said floating piston 106 opposite an axial appendage 116.

A concentric passage opening 126 is provided in the second radial wall section 110 through which extends axial section 74 of damper cap 70 and damper piston rod 32 with control rod 56 received therein radially inwardly of said axial section 74.

Radial section 72 of said damper cap 70 is arranged within said first cylinder 20 and spatially distanced from an end 128 of casing wall 80 of said first cylinder 20 facing away from said first load-applying segment 22.

The end 128 of casing wall 80 of said first cylinder 20 acts as a stop 130 for full floating piston 106 and restricts the axial displaceability of said full floating piston 106 toward said first load-applying segment 22.

In the stop position shown in FIG. 1, in which piston 106 abuts stop 130, second radial wall section 110 contacts the end 128 of casing wall 80 of said first cylinder 20.

In this stop position, an auxiliary chamber and/or chamber 132 is limited by radial section 72 of damper cap 70, by axial section 74 of damper cap 70, by the second radial wall section 110 of the full floating piston 106 as well as by the inner surface 82 of casing wall 80 of the first cylinder 20.

As need may be, but not shown in FIG. 1, is the sealing of the end of the second radial wall section 110 facing said axial section 74 of said damping cap 70 relative said axial section 74 by means of a suitable sealant.

The spring 16 arranged in chamber 132 is in particular a spring which in this disclosure is also referred to as a third spring. Said spring 16 is configured as an elastomer spring 134.

In the position in accordance with FIG. 1, said elastomer spring 134 is compressed.

FIG. 1 moreover shows a stop 136 which limits the mobility of the full floating piston in the direction opposite first load-applying segment 22.

Positive spring 102 is configured as a gas spring and is supported at cap 30 as well as at full floating piston 106 and, to be precise, on the side opposite said springs 16, 12.

The force exerted on full floating piston 106 by positive spring 102 is countered at said piston by the resulting force introduced by negative spring 12 and spring 16 on piston 106, and that notably in the axial direction.

Figure 2:
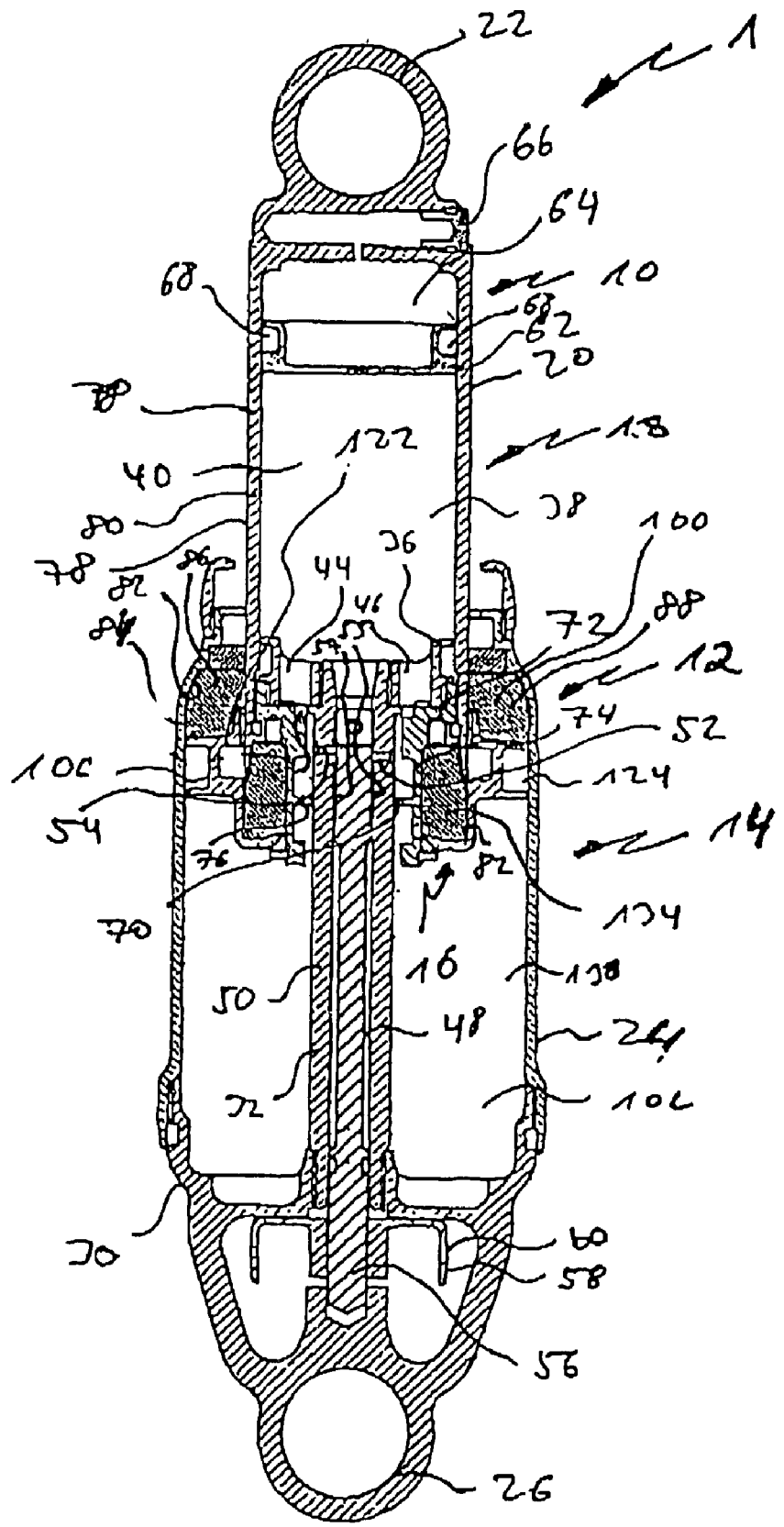
FIG. 2 is the configuration according to FIG. 1 in a second position.

FIG. 2 shows the configuration according to FIG. 1 in a second position in which spring system 1 is substantially fully extended.

The elastomer negative spring 88 is compressed in this position and exerts a correspondingly large force on piston 106.

Elastomer spring 134 is slacker than in the position depicted in FIG. 1 and may be, as the need arises, completely untensioned. The volume of the chamber in which elastomer spring 134 is accommodated is correspondingly enlarged.

Positive spring 102 is likewise substantially unstressed. The volume of a chamber 138 in which positive spring 102 is accommodated is enlarged in comparison with the FIG. 1 position.

Figure 3:
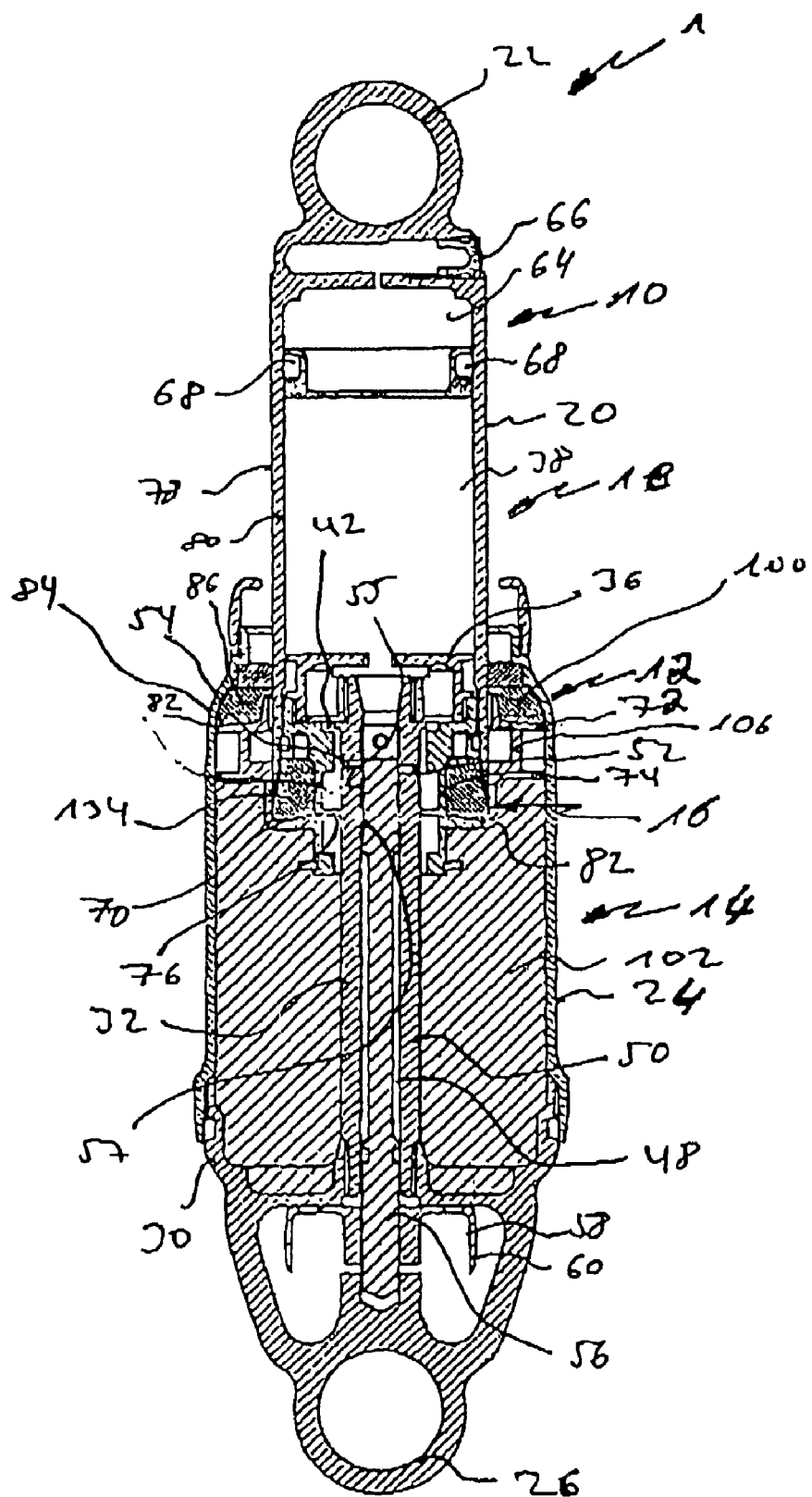
FIG. 3 is a schematic representation of an exemplary embodiment of the invention in a first position.
Figure 4:
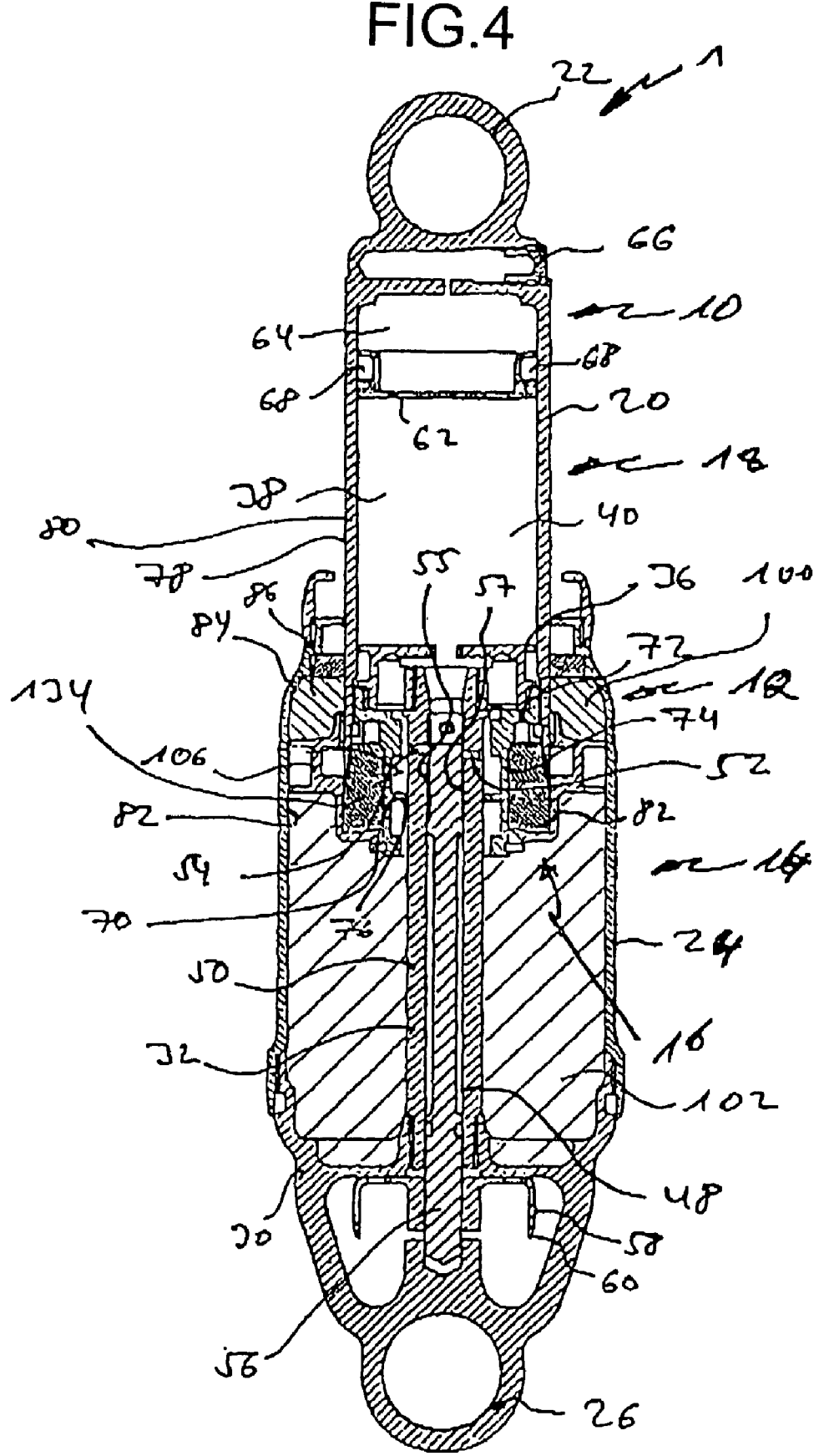
FIG. 4 is the configuration according to FIG. 3 in a second position.

Using the exemplary configuration in accordance with FIGS. 3 and 4, the following will describe how the pressure/force relationships of the positive spring can affect the force/pressure relationships of negative spring 12 and third spring 16, especially when given the relative position of the first cylinder 20 with respect to second cylinder 24.

It must, however, first be noted in conjunction hereto that the present invention is not to be limited by these preferred influencing conditions.

In the representation according to FIG. 3, positive spring 102 exerts a greater axial force, higher pressure respectively, on full floating piston 106 as in the representation shown in FIG. 4.

This thereby induces a decreasing in size of the chamber in which spring 16, elastomer spring 134 respectively, is arranged relative the depiction given in FIG. 4, respectively spring 16 is subject to greater load/compression.

It is further induced that negative spring 12, elastomer negative spring 88 respectively as depicted in FIG. 3 is subject to greater tension/compression as is the case shown in FIG. 4. The volume of chamber 100 in the depiction represented by FIG. 3 is less than that depicted in the FIG. 4 representation.

It is to be noted that elastomer spring 134 as well as elastomer negative spring 88 in the configurations according to FIGS. 1–4 may also be replaced by gas springs, whereby in this case, the corresponding chambers may be sealed as necessary by means of additional sealants. Elastomer spring 134 as well as elastomer negative spring 88 may also be configured as steel springs or as a differently configured spring.

What is claimed is:

1. A spring system for bicycles, comprising:
    a first load-applying segment and a second load-applying segment;
    at least one positive spring and at least one negative spring arranged to be operatively effective between said first and said second load-applying segments; and
    at least one full floating piston between said positive spring and said negative spring;
    a first cylinder extends axially displaceably in a second cylinder;
    said at least one full floating piston being moveable relative to said first cylinder and said second cylinder;
    wherein said positive spring and said negative spring load the full floating piston axially in opposing directions; and wherein said positive spring and said negative spring load said second cylinder in opposing directions;
    wherein said full floating piston is supported at a radially outer situated surface of a casing wall of said first cylinder; and
    wherein said full floating piston projects axially from the end of said first cylinder facing said second cylinder.

2. The spring system according to claim 1, wherein said positive spring and said negative spring respectively abut and load said full floating piston.

3. The spring system according to claim 1, wherein said positive spring and/or said negative spring are arranged respectively in a separate chamber or are configured to work in concert together with a respective chamber.

4. The spring system according to claim 1, wherein at least one other third spring apart from said positive spring and said negative spring loads said full floating piston.

5. The spring system according to claim 1, wherein said full floating piston comprises at least one first wall section extending in a substantially radial direction as well as a second wall section extending in substantially radial direction whereby said wall sections are arranged offset one another in the axial direction of said full floating piston.

6. The spring system according to claim 5, wherein at least one of said wall sections of said full floating piston is arranged axially offset one another and is provided with at least one recess for receiving a sealing element.

7. The spring system according to claim 5, wherein said first wall section and said second wall section are connected by means of a third wall section configured as a connecting wall.

8. The spring system according to claim 7, wherein said connecting wall is of substantially cylindrical configuration.

9. The spring system according to claim 5, wherein one of said wall section of said full floating piston is arranged axially offset one another and extends substantially radially inwardly from a connecting wall and said a other of said wall section extends substantially radially outwardly from said connecting wall.

10. The spring system according to claim 1, wherein said full floating piston comprises a first wall section, a second wall section, and a third wall section extending in a substantially axial direction, said first wall section extending from said third wall section in a substantially radial direction and said second wall section likewise extending from said first wall section in a substantially radial direction.

11. The spring system of claim 1, wherein said full floating piston is of substantially rotation symmetrical configuration.

12. The spring system according to claim 1, wherein said full floating piston is of substantially cup-shaped configuration.

13. The spring system according to claim 1, wherein a first piston area arrangement of said full floating piston, which is aligned in a first axial direction, is contacted and loaded by at least two different spring mechanisms, and that a second piston area arrangement of said full floating piston, which is aligned in a second axial direction opposite to said first axial direction, is contacted and loaded by at least one further spring mechanism.

14. The spring system according to claim 1, wherein at least one damping means is provided.

15. The spring system according to claim 1, wherein a third spring is supported at said full floating piston as well as at said first cylinder.

16. The spring system according to claim 1, wherein an axial displaceability of said full floating piston is restricted in at least one orientation by stop means.

17. The spring system according to claim 1, further including said first cylinder acting in the axial direction as stop means for said full floating piston.

18. The spring system according to claim 1, wherein said full floating piston comprises at least one bushing-like element extending substantially axially as well as a first wall section extending substantially radially and a second wall section extending substantially radially, wherein one of said wall sections extends substantially radially inwardly from said bushing-like element and wherein said an other of said wall section extends substantially radially outwardly from said bushing-like element and whereby said wall sections are arranged, when seen from the axial direction, in substantially the same area.

19. A spring system for bicycles, comprising:
   a first load-applying segment and a second load-applying segment;
   at least one positive spring and at least one negative spring arranged to be operatively effective between said first and said second load-applying segments; and
   at least one full floating between said positive spring and said negative spring;
   a first cylinder extends axially displaceably in a second cylinder;
   said at least one full floating piston being moveable relative to said first cylinder and said second cylinder; and
   wherein said positive spring and said negative spring load the full floating piston axially in opposing directions; and wherein said positive spring and said negative spring load said second cylinder in opposing directions;
   said first cylinder having a radially outer surface; and
   said second cylinder having a radially inner surface; and
   said full floating piston being slidably supported by said radially outer surface of said first cylinder and by said radially inner surface of said second cylinder.

20. A spring system for bicycles, comprising:
   a first load-applying segment and a second load-applying segment;
   at least one positive spring and at least one negative spring arranged to be operatively effective between said first and said second load-applying segments; and
   at least one full floating between said positive spring and said negative spring;
   wherein said full floating piston is supported at a radially outer situated surface of a casing wall of said first cylinder; and wherein said full floating piston projects axially from an end of said first cylinder facing said second cylinder;
   a first cylinder extends axially displaceably in a second cylinder;
   wherein said at least one full floating piston being moveable relative to said first cylinder and said second cylinder;
   wherein said positive spring and said negative spring load the full floating piston axially in opposing directions; and wherein said positive spring and said negative spring load said second cylinder in opposing directions;
   a damper piston axially flexible within said first cylinder and separating a first damper chamber from a second damper chamber, wherein said damper piston includes a plurality of passage openings connecting said first damper chamber with said second damper chamber; and
   a piston rod having an axially extending cavity surrounded by a piston casing wall having a plurality of damper openings connecting said cavity with said second damper chamber.

* * * * *